(12) United States Patent
Blochmann et al.

(10) Patent No.: US 8,608,471 B2
(45) Date of Patent: Dec. 17, 2013

(54) TEMPERATURE-CONTROLLED STRETCHING ROD

(75) Inventors: Erik Blochmann, Neutraubling (DE); Arno Haner, Wiesent (DE)

(73) Assignee: Krones AG, Neutraubling (DE)

(*) Notice: Subject to any disclaimer, the term of this patent is extended or adjusted under 35 U.S.C. 154(b) by 268 days.

(21) Appl. No.: 12/998,124

(22) PCT Filed: Sep. 1, 2009

(86) PCT No.: PCT/EP2009/061245
§ 371 (c)(1),
(2), (4) Date: Jun. 3, 2011

(87) PCT Pub. No.: WO2010/031680
PCT Pub. Date: Mar. 25, 2010

(65) Prior Publication Data
US 2011/0236524 A1 Sep. 29, 2011

(30) Foreign Application Priority Data
Sep. 18, 2008 (DE) .................. 10 2008 047 891

(51) Int. Cl.
*B29C 49/12* (2006.01)
(52) U.S. Cl.
USPC ........................ 425/526; 425/529

(58) Field of Classification Search
USPC .................................. 425/526, 529
See application file for complete search history.

(56) References Cited

U.S. PATENT DOCUMENTS

| | | | | |
|---|---|---|---|---|
| 3,116,516 A | * | 1/1964 | Moslo | 425/526 |
| 3,690,802 A | * | 9/1972 | Fischer et al. | 425/526 |
| 5,182,122 A | | 1/1993 | Uehara et al. | 425/526 |
| 5,290,506 A | | 3/1994 | Yokobayashi | 264/520 |
| 7,687,011 B2 | | 3/2010 | Voth et al. | 264/520 |

FOREIGN PATENT DOCUMENTS

| | | |
|---|---|---|
| DE | 25 17 186 A1 | 10/1976 |
| DE | 692 04 350 T2 | 4/1996 |
| DE | 101 44 537 A1 | 3/2003 |
| DE | 10 2004 018 146 A1 | 10/2005 |
| EP | 0 511 617 B1 | 11/1992 |
| JP | 60 180814 A | 9/1985 |
| JP | 05 131528 A | 5/1993 |

* cited by examiner

*Primary Examiner* — Robert B Davis
(74) *Attorney, Agent, or Firm* — Davidson, Davidson & Kappel, LLC

(57) ABSTRACT

A hollow stretching rod (10) of a device for blow molding containers is disclosed, wherein the stretching rod (10) has a temperature control medium in an internal conduit (12) for controlling the temperature, and wherein a distance is formed, at least over a certain portion, between the internal conduit (12) and an inner wall (14) of an outer enclosure (13) of the stretching rod (10).

5 Claims, 4 Drawing Sheets

Cross Section B-B

Cross Section A-A

TEMPERATURE-CONTROLLED STRETCHING ROD

The invention relates to a hollow stretching rod of a device for blow moulding containers, wherein the stretching rod comprises a temperature control medium in an internal conduit for controlling the temperature.

BACKGROUND

From the published patent application DE 2 517 186 A1, a temperature-regulating element is already known for the continuously variable supply or removal of heat by means of a liquid or gaseous heating or cooling medium, with said temperature-regulating element being, in particular, employed in plastics processing. The temperature-regulating element is formed as a hollow tube and separated by a dividing wall into two chambers arranged axially adjacent to one another and connected with a housing. At its free end, the tube is closed with a lid and in this case connected with both axially adjacent chambers by means of a recess so as to ensure circulation or forced reflux of the medium. This construction method obviates the need for elaborately drilled and sealed circulation systems, and the temperature-regulating elements can be employed in an operationally convenient manner and effective position, regardless of the type of tool construction. What needs to be considered in this case, however, is that in this process the entire stretching rod will be temperature-controlled.

The published patent EP 0 511 617 B1 discloses a method involving stretch-blow injection moulding of a hollow body. This method is performed by means of a stretching rod that is formed to be hollow. For this purpose, the temperature of the end portion of the hollowly formed stretching rod is regulated in such a manner as to adjust the temperature to a lower level than that of the preform. As a consequence, the invention supports the direct heat exchange between those parts that are in contact with each other. The heat exchange is achieved by a temperature control medium that circulates through the stretching rod, by said temperature control medium being passed through an inner tube and streaming downward to the end portion of the stretching rod. This medium is subsequently passed back upward through the outer, circular tube. The above method also exposes the entire stretching rod to the process of temperature control. This results in the formation of condensation. Said condensate forms on the preform.

SUMMARY OF THE INVENTION

So far, the known temperature-regulating elements cannot prevent condensation from forming on the preform. With the production rate continuously increasing, however, special attention to the temperature of the stretching rod also becomes an important issue, for instance when it comes to keeping a constant temperature at the point of contact between the tip of the stretching rod and the preform. According to prior art, temperature regulation is so far predominantly achieved by passing the temperature control medium required for the temperature control of the stretching rod through a supply line into said stretching rod and feeding it back through a return line or by having the medium stream out at the end of the supply line and feeding it back up through two return lines. Whichever of the two may be the case, the formation of condensation on the preform is not prevented in either method, as the entire stretching rod is exposed to temperature regulation or to cooling.

It is an object of the present invention to provide a stretching rod that will prevent the formation of condensation on the plastic preform in the process of temperature regulation of the tip of the stretching rod.

The present invention provides a hollow stretching rod which features, at least over a certain portion, a distance between an inner wall of the stretching rod and an internal conduit for temperature control. The stretching rod has a temperature control medium in an internal conduit for controlling the temperature, characterised in that an insulating distance is formed, at least over a certain portion, between the internal conduit and an inner wall of an outer enclosure of the stretching rod.

The distance existing, at least over a certain portion, between the inner wall of an outer enclosure of the stretching rod and the internal conduit can define an air-filled space. In one embodiment of the present invention, this air-filled space forms the insulation for the stretching rod. The insulation fulfills the purpose of preventing the stretching rod to be unnecessarily cooled or temperature-regulated in the process of the temperature control medium passing through the internal conduit into the tip of the stretching rod. The insulation function is thus created by so-called air cooling.

The air is cooled by the temperature control medium flowing through the internal conduit. The internal conduit can in particular be formed by a tube system with a supply line and a return line, while the outer enclosure, disposed at a distance thereof, can be formed as a larger tube. For temperature control purposes, it is possible to employ cooling agents of a gaseous, liquid, or solid consistency, or also agents such as are available as a mixture of substances. These cooling agents have the sole purpose of conducting heat away from the tip of the stretching rod. In addition to cooling agents, it is also possible to employ heating means (heating media) as a heat carrier. The present invention is predominantly used with water as a cooling agent.

Not the stretching rod per se need be cooled, but rather only the tip of the stretching rod, which moreover results in stabilizing the process by the fact that the temperature between the point of contact, the tip of the stretching rod, and the inner base wall of the preform is kept constant. The present invention also generates no temperature conflict between the stretching rod and the seal.

The internal conduit of the hollow stretching rod that is in place for the purpose of controlling the temperature can comprise at least one supply and at least one return line. These are formed as separate, parallel conducts that can, in addition, also be arranged in a coaxial manner in relation to each other. The separate, parallel conducts moreover comprise open ends that are connected with each other by the tip of the stretching rod. This construction allows the tip of the stretching rod to be in direct contact with the internal conduit, so that in this design the air-filled space at the tip of the stretching rod is omitted.

The tip of the stretching rod can be produced separately as an individual component and subsequently disposed on the hollow stretching rod. In order to create a circulation system between the internal conduits for the temperature control medium, the conducts can be inserted into the tip of the stretching rod by means of drilled holes. It is also possible to produce the tip of the stretching rod in a casting process. For this purpose, the conducts for the temperature control medium can be directly moulded into the casting.

The temperature control medium can stream through this conduit in the stretching rod, through the supply line downward to the tip of the stretching rod, and it is subsequently passed back upward through the return line. In one possible embodiment, this process is enabled by the supply and the return lines being connected with each other in the tip of the stretching rod by means of drilled holes. Vertical drillings are disposed on the top side of the tip of the stretching rod in extension of the conduits. These drillings are additionally connected with a horizontal drilling, which is disposed on the side of the tip of the stretching rod. This hole is not drilled through, and its open side is sealed. In this way, the temperature control medium can circulate in the tip of the stretching rod.

It is possible to control the temperature in the tip of the stretching rod by means of the circulating temperature control medium in such a way as to achieve an optimal temperature, at all times, at the point of contact between the tip of the stretching rod and the inner base wall of the preform.

In a further possible embodiment, the supply and return lines could be formed as coaxial tubes. In such a case the temperature control medium would flow over the centrally disposed supply line with the smaller diameter into the tip of the stretching rod. The diameter of the supply line is smaller than that of the return line and the supply line is moreover disposed within the return line.

The temperature control medium that flows downward over the centrally disposed supply line to the tip of the stretching rod is then passed back upward via the return line. In the process, the supply line dips deeper into the tip of the stretching rod in order to ensure an improved return flow of the temperature control medium.

In this embodiment, therefore, only the return line is disposed at a certain distance from the inner wall of the stretching rod. Here, too, an air gap is provided as insulation between the outer wall of the return line and the inner wall of the outer enclosure of the tip of the stretching rod.

The tip of the stretching rod in this exemplary embodiment is also a separate component that is disposed on the hollow stretching rod. The tubes for the supply and return lines are positioned first. Then the tip of the stretching rod that is equipped with a recess is welded to the outer wall of the return line. Afterwards, the actual stretching rod tube is placed over the supply and return line tubes. The end of the stretching rod tube comes to rest on a protrusion of the tip of the stretching rod and forms a straight junction on the outside. There is another welded joint between the tip and the outside of the stretching rod, with said welded joint providing additional stability to the hollowly formed rod and ensuring improved attachment between the tip of the stretching rod and the stretching rod itself.

Preferably, the tip of the stretching rod as well as the hollow stretching rod itself are made from a material that conducts heat well, for instance metal.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

Figure 1:
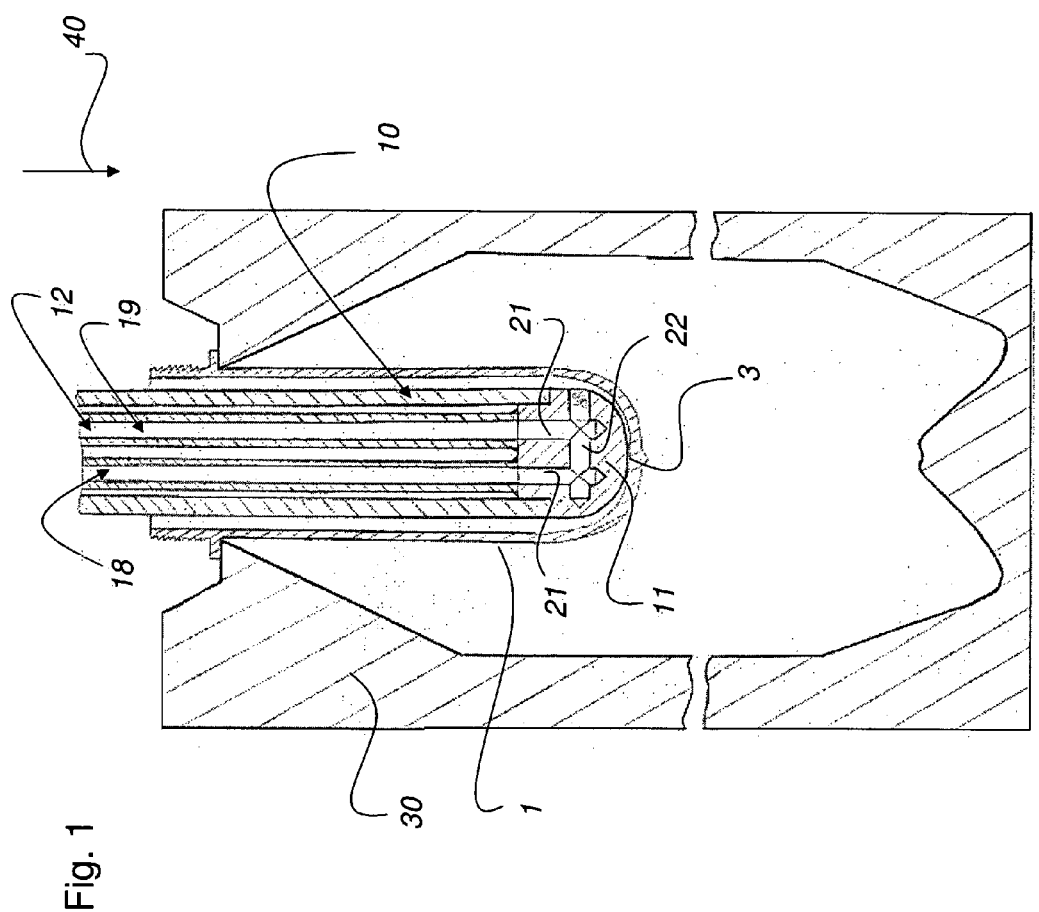
FIG. 1 illustrates an embodiment of a biaxial stretch-blow-moulding device in a schematic cross-section.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

FIG. 1 illustrates a schematic cross-section of an embodiment, wherein the preform 1 is clamped into a blow-mould 30. The stretching rod 10 is moved downward in longitudinal direction 40 into the clamped preform 1 until the said stretching rod 10 and the inner base wall 3 of the preform 1 come in contact with each other.

For purposes of controlling the temperature, the hollow stretching rod 10 is equipped with an internal conduit 12. In the present embodiment, said internal conduit 12 is provided with a supply line 18 and a return line 19.

In order to be able to control the temperature of the tip of the stretching rod 11 by means of a temperature control medium (not illustrated here), it is necessary to establish a connection between the supply line 18 and the return line 19 and the tip of the stretching rod 11. The said connection in the tip of the stretching rod 11 is achieved by means of drilled holes. For this purpose, two vertical drillings 21 are required at a distance corresponding to that between supply line 18 and return line 19; and moreover, a lateral, centrally disposed transverse hole 22 that cuts through both vertical drillings 21 is necessary for creating a passage. Said transverse hole 22 is open on one side and re-sealed in a suitable manner by means of a sealing medium 23.

Figure 2:
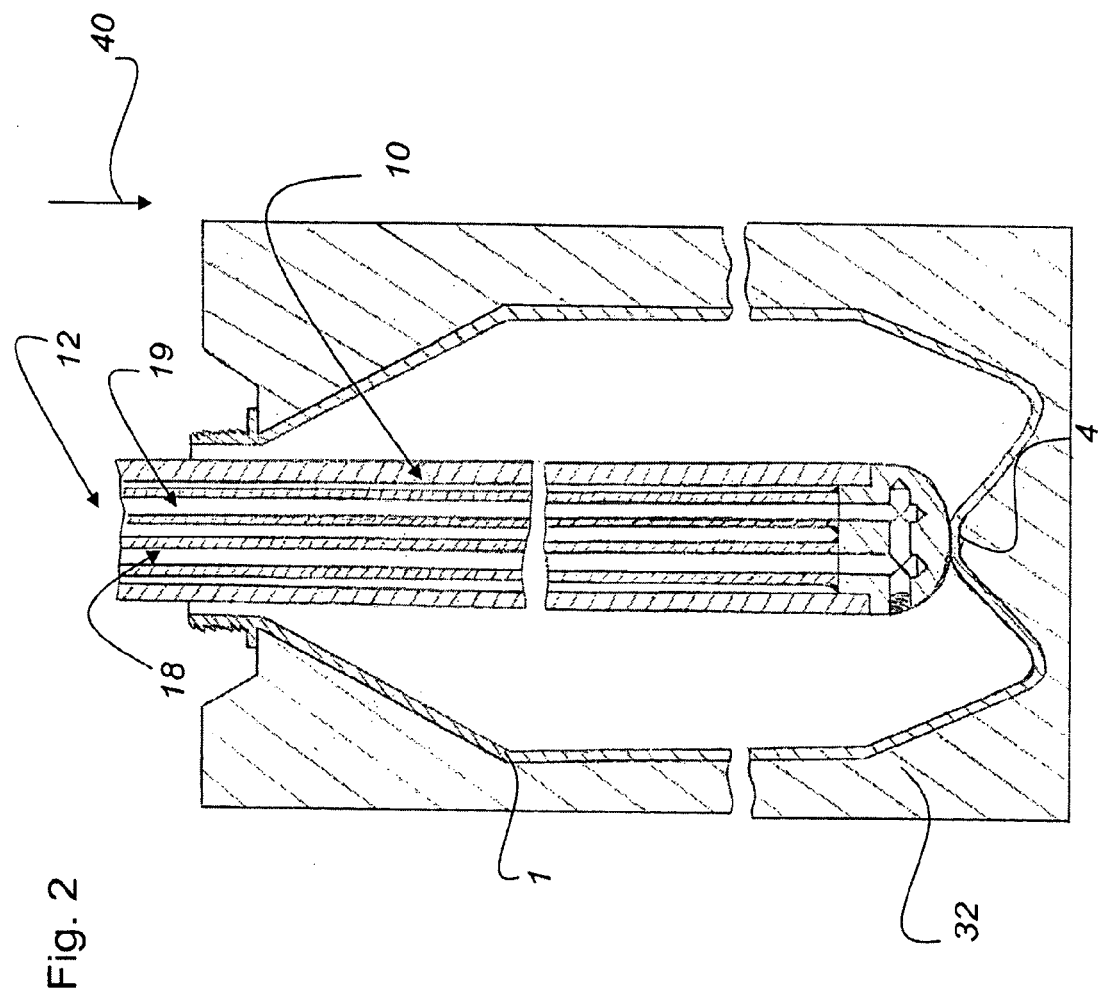
FIG. 2 illustrates a cross-section of the final state of a preform that has been formed by introducing blow air.

FIG. 2 illustrates a cross-section of the final state of a preform (not illustrated here) as a container 2, which has been formed by introducing blow air. The hollow stretching rod 10 begins the stretch-blowing process for stretching the preform (not illustrated here) by moving in longitudinal direction 40. The final state of stretching is reached when the outer base wall 4 of the preform 1 has approached the blow mould 30, i.e. when the preform 1 has come into contact with the base of the blow mould.

Figure 3:
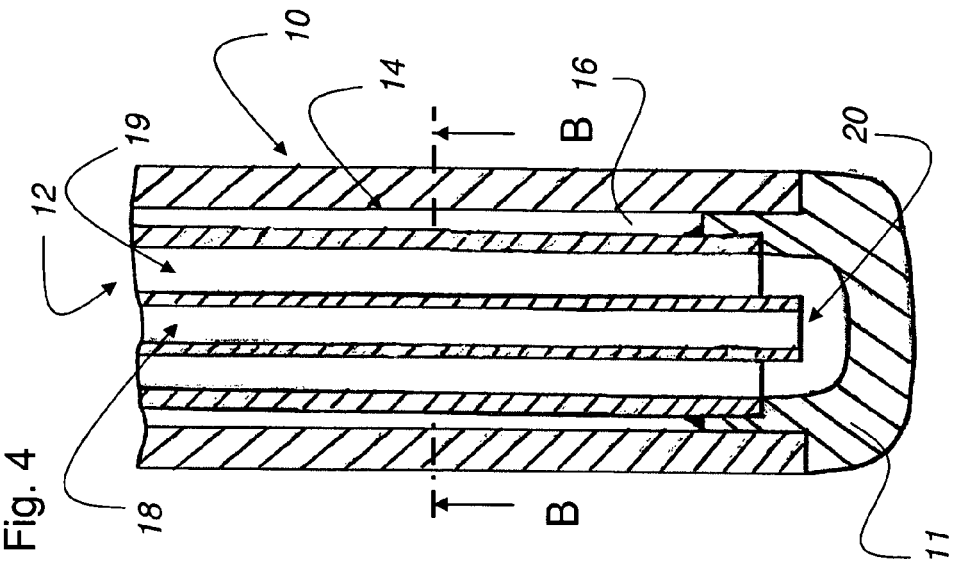
FIG. 3 illustrates a cross-section of a possible embodiment for the tip of the stretching rod as well as the stretching rod itself with a supply and a return line.

FIG. 3 illustrates an enlarged section of a possible embodiment for the tip of the stretching rod 11 as well as the stretching rod 10 itself with a supply line 18 and a return line 19. The connection between the internal conduit 12 of the temperature control and the tip of the stretching rod 11 can be seen very well in FIG. 3. The drillings are applied before disposing the tip of the stretching rod 11 on the stretching rod 10 itself. The transverse hole 22 is then sealed at the side by means of a sealing medium 23. The accuracy of the vertically drilled holes 21 further adds to enable a steady circulation of the temperature control medium (not illustrated here).

The supply line 18 and the return line 19 are arranged at a distance to the inner wall 14 of the stretching rod's 10 outer enclosure 13. This distance is formed as an air gap 16 and it is sealed off by the affixed tip of the stretching rod 11 at the end of the parallel supply line 18 and the return line 19.

The tip of the stretching rod 11 is connected to the supply line 18 and the return line 19 by means of a welded joint 17. The tip of the stretching rod 11 is separately connected with the stretching rod 10. This connection results from the welded joint 17 between the tip of the stretching rod 11 and the outer wall 15 of the stretching rod 10.

Figure 4:
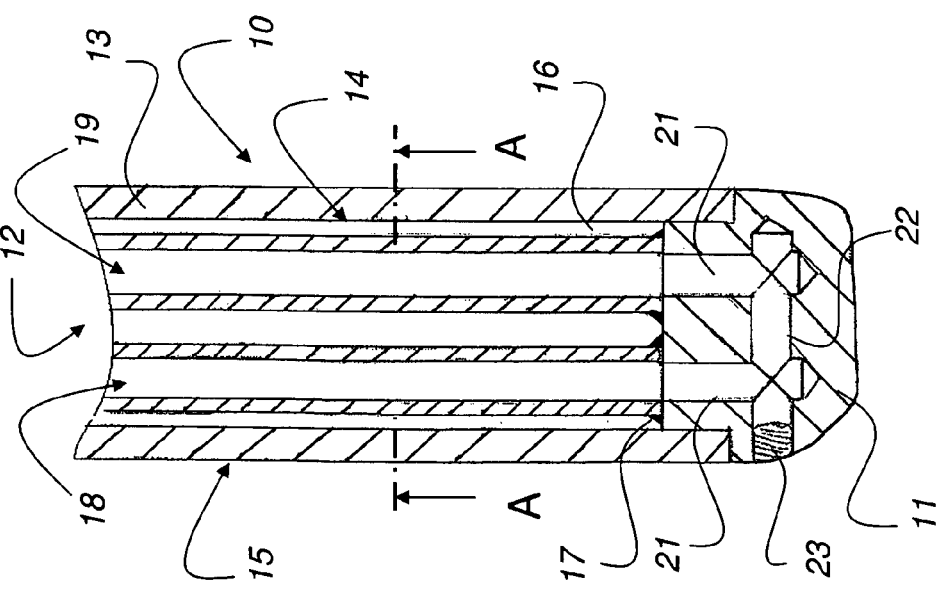
FIG. 4 illustrates a cross-section of another possible embodiment for the stretching rod with one supply line and two return lines.
Figure 6:
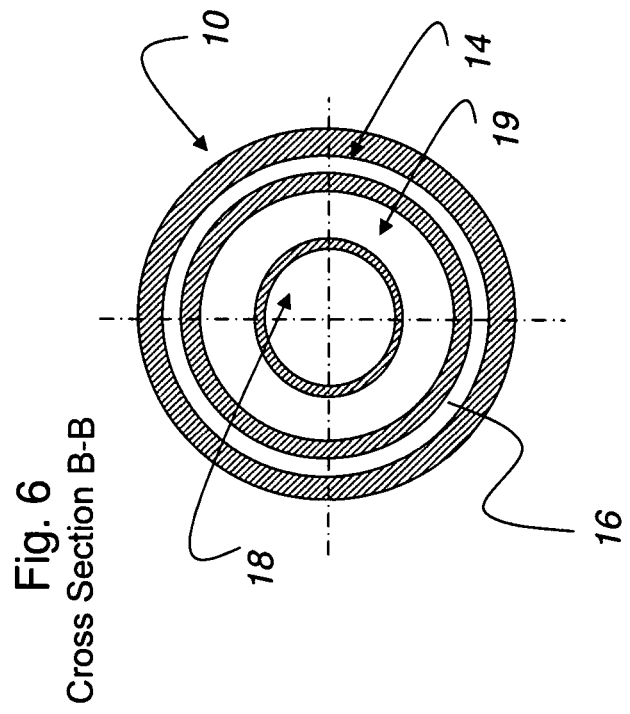
FIG. 6 illustrates an enlarged presentation of a horizontal section B-B through the stretching rod from FIG. 4.

FIG. 4 illustrates a cross-section of another possible embodiment for the tip of the stretching rod 11 and the stretching rod 10 itself. In this embodiment, a supply line 18 is used for the internal conduit 12 of the temperature control. In FIG. 6 the supply line 18 is formed as a tube with a smaller diameter than that of the return line, with the supply line 18 penetrating further into the tip of the stretching rod 11 at the same time. The supply line 18 here also serves the purpose of introducing the temperature control medium (not illustrated here) into the tip of the stretching rod 11; and the return line 19, which is disposed coaxially around the supply line 18, serves the purpose of issuing the temperature control medium from the tip of the stretching rod 11.

The distance between the return line 19 and the inner wall 14 of the stretching rod 10 is in place in this embodiment as well as in the first embodiment. In this embodiment the said distance is also formed as an air gap 16, so that the stretching rod 10 will not be temperature-regulated or cooled during the process of introducing the temperature control medium into the tip of the stretching rod 11 in order to control the temperature of said tip 11.

The tip of the stretching rod 11 is also disposed on the stretching rod 10 itself in this embodiment and firmly connected to it by means of welding, for instance.

Figure 5:
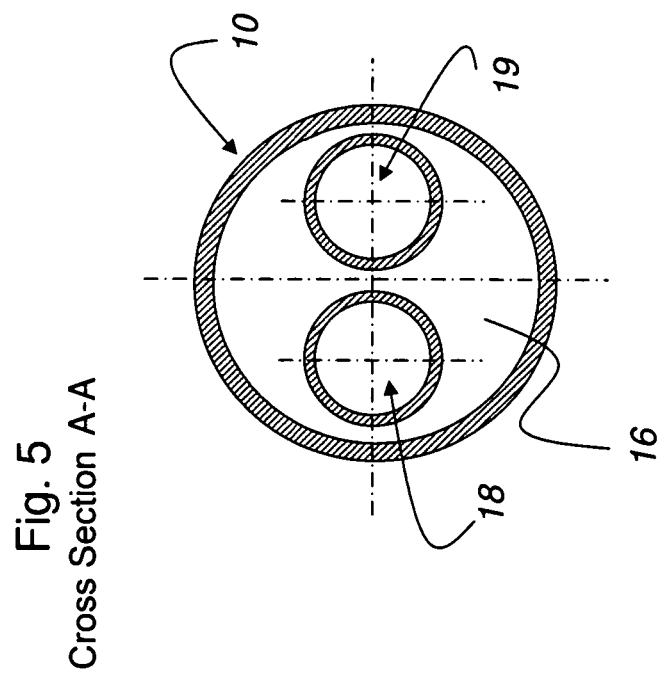
FIG. 5 illustrates an enlarged presentation of a horizontal section A-A through the stretching rod from FIG. 3.

FIG. 5 illustrates an enlarged presentation of a horizontal section A-A of a possible embodiment for the stretching rod 10 from FIG. 3. As can be seen, the supply line 18 and the return line 19 comprise two tubes that are arranged at the same height in relation to each other. By forming the conducts as tubes, the air gap 16 between these conducts and the inner wall 14 of the stretching rod 10 becomes larger. The larger the air filled space 16 is, the better is the insulation provided for the stretching rod 10.

FIG. 6 illustrates an enlarged presentation of another horizontal section B-B of another possible embodiment for the stretching rod from FIG. 4. The arrangement of the supply line 18 and the return line 19 are again distinguishable in this section. These conducts are formed as tubes.

The distance between the return line 19 and the inner wall 14 of the stretching rod 10 is in place in this embodiment as well as in the first embodiment. Again, the said distance is formed as an air gap 16.

The supply line 18 is smaller in diameter than the return line 19, and moreover, said supply line 18 is disposed centrally inside the return line tube 19.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The invention claimed is:

1. A device for blow molding containers with a hollow stretching rod, the hollow stretching rod comprising:
   an internal conduit having a temperature control medium for controlling the temperature; and
   an outer enclosure having an inner wall, an insulating distance being formed, at least over a certain portion, between the internal conduit and the inner wall of the outer enclosure;
   the internal conduit being formed from at least one supply line and at least one return line, the supply line and the return line being formed by separate, parallel conducts, open ends of the supply line and the return line being connected via a tip of the stretching rod.

2. The device as recited in claim 1 wherein the insulating distance is an air-filled space.

3. The device as recited in claim 1 wherein the internal conduit is in direct contact with the tip of the stretching rod.

4. The device as recited in claim 1 wherein the supply line and the return line are each arranged at the insulating distance to the surrounding outer enclosure and in that a space formed by the insulating distance is filled with air.

5. The device as recited in claim 1 wherein the stretching rod, including the tip of the stretching rod, are made from metal.

\* \* \* \* \*